ANALOG-TO-DIGITAL MULTIPLEX CODER
Filed July 18, 1966 2 Sheets-Sheet 1
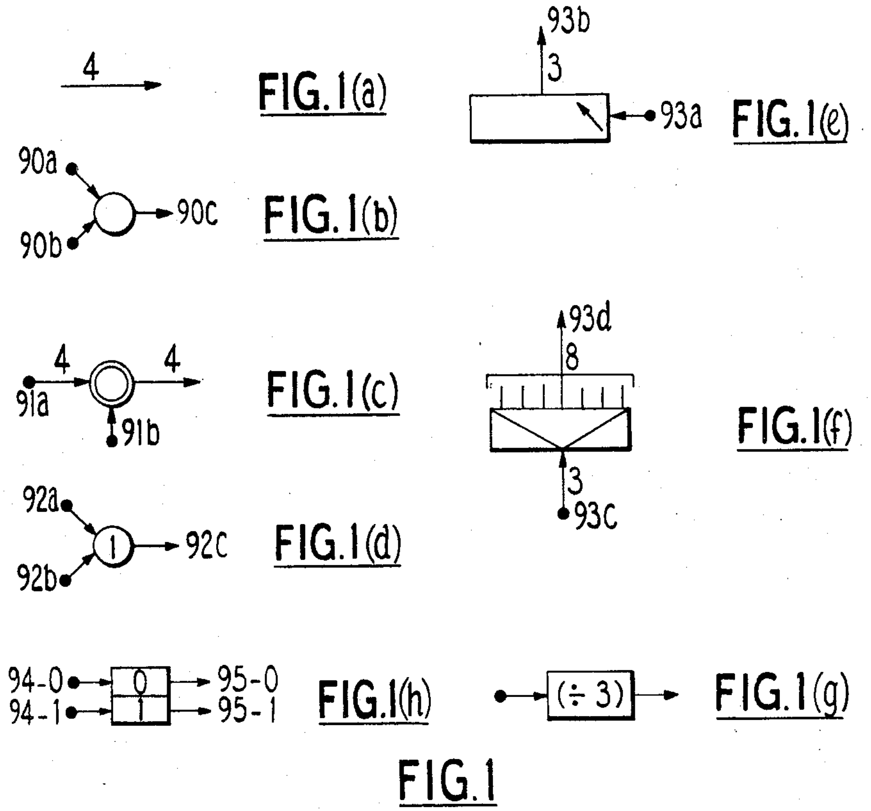
FIG. 1(a) FIG. 1(b) FIG. 1(c) FIG. 1(d) FIG. 1(e) FIG. 1(f) FIG. 1(g) FIG. 1(h)
FIG. 1
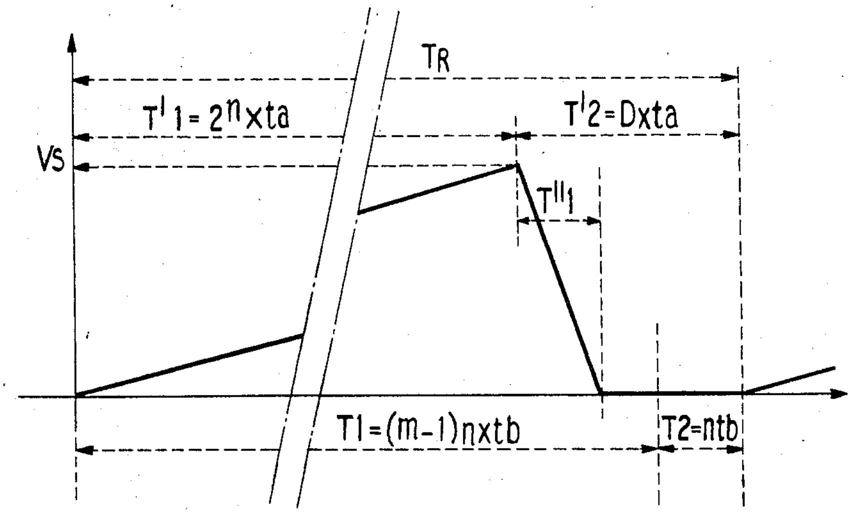
FIG. 2
Inventor
ANDRE E. J. CHATELON
By Percy P. Lantzy
Attorney Sept. 22, 1970 A. E. J. CHATELON 3,530,459

ANALOG-TO-DIGITAL MULTIPLEX CODER

Filed July 18, 1966 2 Sheets-Sheet 2

Inventor
ANDRE E. J. CHATELON

By Percy P. Lantzy
Attorney 3,530,459

ANALOG-TO-DIGITAL MULTIPLEX CODER

André Edouard Joseph Chatelon, Montrouge, France, assignor to International Standard Electric Corporation, New York, N.Y., a corporation of Delaware Filed July 18, 1966, Ser. No. 566,035
Claims priority, application France, July 21, 1965, 25,372
Int. Cl. H03k *13/02*
U.S. Cl. 340—347 10 Claims

ABSTRACT OF THE DISCLOSURE

A multichannel PCM coder in which a single increasing amplitude reference signal having a duration substantially equal to and coincident with the duration of a frame of the multichannel signal is simultaneously compared with the analog signal in each channel and when equal a control signal is produced. Simultaneously with the reference signal, code groups are generated and the control pulse causes an associated code group to be stored in a part of a first register designated for that channel. At the end of the reference signal, all the code groups of the different channels are instantaneously transferred to a second register from which they are fed out serially while the first register is being loaded.

The present invention concerns an analog to digital multiplex coder with a fixed coding duration in which a sawtooth or staircase voltage is used as a reference signal.

As one knows there are two coding methods, namely, feedback coding and time-modulation coding which make a binary number correspond to a sample of the signal to be coded, a binary number characterizing the amplitude of said sample.

In one feedback coding system, the amplitude of the sample—which is available across the terminals of a capacitor—is compared to the voltage obtained by decoding a number stored in a register in order to determine if the number is too large or too small. The number is decreased in the first case and increased in the second one by modifying a single digit at a time. The comparison operations are continued with modification of digits of decreasing weights until the voltages compared do not differ by more than the value of a quantizing step. The number stored in the register corresponds then to the voltage to be coded. It will be noted that the coding duration is fixed and that it is proportional to the number $n$ of digits in the binary number and to the number of channels in the case of time-division multiplex coding.

In time-modulation coding, the signal to be coded is compared to a sawtooth voltage (or a staircase voltage) the triggering of which is synchronized with that of a pulse generator. This generator feeds a counter and it operates until the amplitudes of the compared signals are equal.

The maximum amplitude which the sawtooth can reach is equal to the maximum amplitude of the signal to be coded and is represented by the highest number the counter can store. In these conditions, the number stored in said counter at the time the pulse generator is blocked corresponds to the voltage to be coded. It will be noted that the duration of this coding is variable and proportional to the amplitude of the signal to be coded. In time-division multiplex coding, this duration is also proportional to the number of channels.

These two methods have a common feature. Each analog signal to be coded must be sampled once per repetition period TR and stored in a capacitor by means of circuits, the implementation of which is delicate when the coder must treat a certain number of analog voltages of various origins in time-division multiplex. In particular, when the coding rate is high, there are cross-talk problems between adjacent channels due to the short time available for discharging the capacitor before storing the value of the next sample in it.

As a general rule, the time period TR is divided into $m$ channel time slots among which ($m$—1) are reserved for the transmission of the codes corresponding to ($m$—1) analog voltages to be coded, the remaining channel being used for transmission of a particular code, the so-called "synchronization" or "framing" code. In case of serial transmission, the transmission rate is, therefore, $m \times n/TR$ digits per second and this expression is obviously independent of the coding method used.

In the present invention, two memories are placed between the coding circuit and the transmission circuit, enabling to dissociate the coding operation per se from the code transmision. More precisely, the amplitudes of the ($m$—1) analog signals are coded during the first part T'1 of the repetition period and the numbers obtained are written in the first memory comprising ($m$—1) lines. During the second part T2 of the repetition period, these codes are transferred to the second memory of the same capacity from which they will be extracted for transmission. The transfer time T2 between the two memories must of course be a time period during which no code corresponding to an analog signal is transmitted (because one cannot write in and read out the second memory at the same time). This time will, therefore, occupy at most the time slot reserved for transmission of the synchronization code.

The coding process is similar to that used in time modulation coding, but it differs from it by the following points:

(1) The sawtooth is continuously generated at the frequency $1/TR$, so that the coding duration is fixed. The latter depends only on the counter speed which must count from 0 to $2^n$ during the rise time of the sawtooth which is smaller than TR. This coder is, therefore, $m$ times faster than a classical time-modulation coder, the coding duration being constant whatever be the number of channels.

(2) There is no sampling and no storing of the analog signals as comparisons are effected permanently during each time period T'1.

The object of the present invention is, therefore, to implement an analog to digital coder of the time-modulation type which operates in time-division multiplex and in which the coding duration is independent of the number of channels.

The present invention will be particularly described with reference to the accompanying drawings, in which:

FIG. 1 represents various symbols used in the block diagram of FIG. 3;

FIG. 2 represents a repetition period of the reference signal; and

Figure 3:
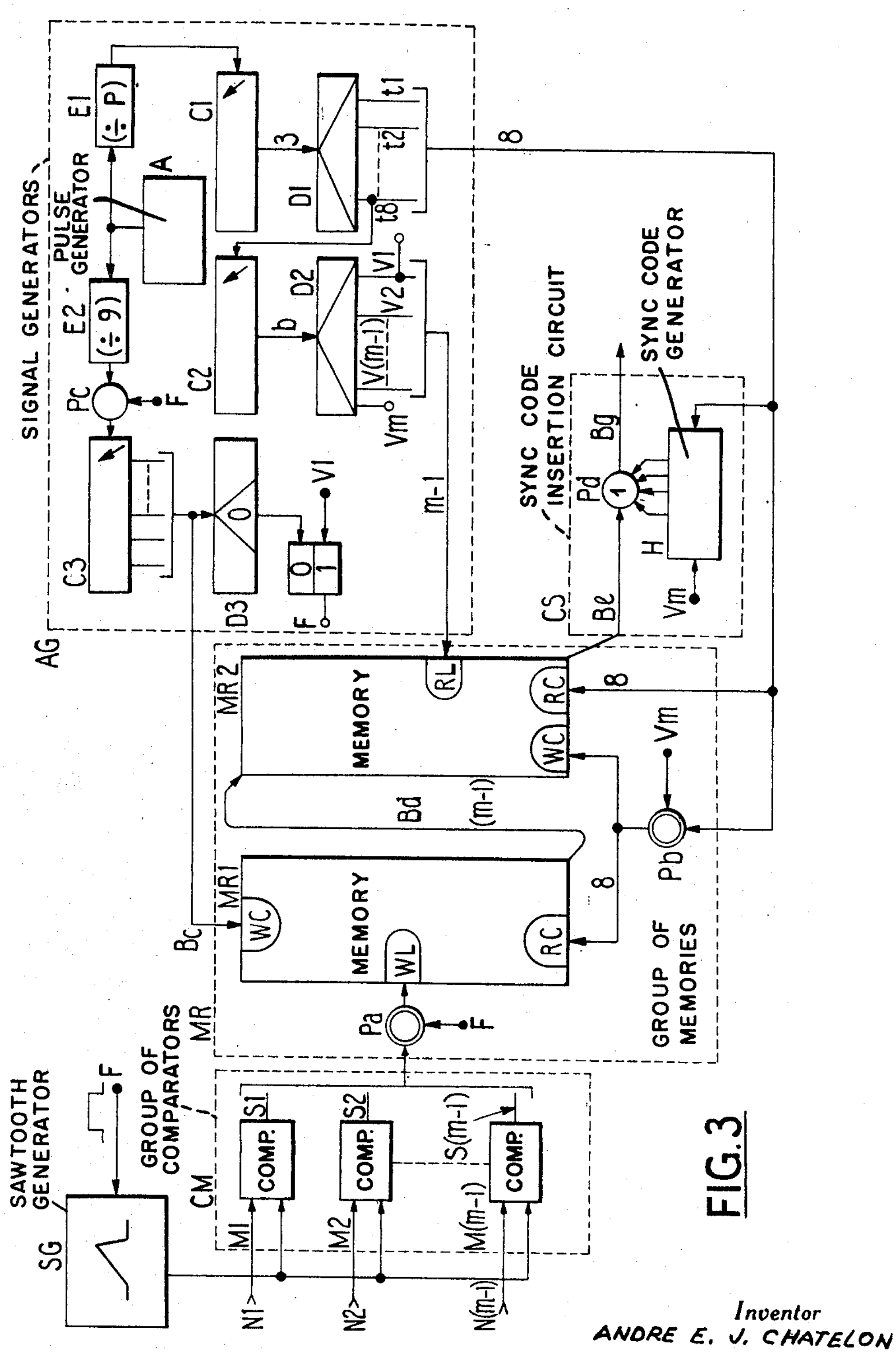
FIG. 3 represents a block diagram of the coder according to the present invention.

Before entering into the description of the invention, the meaning of some particular symbols used in FIG. 3 will be made clear with reference to FIG. 1:

FIG. 1($a$) represents a group of several conductors, namely, four conductors in the present example;

FIG. 1($b$) represents a coincidence gate or "AND circuit" with two inputs 90$a$, 90$b$, which delivers a signal on its output 90$c$ when control signals are applied simultaneously to said inputs;

FIG. 1($c$) represents a multiple AND circuit, i.e., a circuit comprising, in the example, four AND circuits of which one input is connected to each of the conductors 91$a$ and the second input is connected to a common conductor 91$b$;

FIG. 1(*d*) represents an OR circuit which yields a signal on its output 92*c* when a signal is applied to at least one of its inputs 92*a*, 92*b*;

FIG. 1(*e*) represents a flip-flop counter to which advance pulses are applied on its input 93*a* and which counts up to 8. If it operates in pure binary code, or in Gray code, this counter comprises three flip-flops the information of which is available on the group of three conductors 93*b*;

FIG. 1(*f*) represents a decoder which, in the case of the example, transforms a 3-bit binary code applied over the group of conductors 93*c* in a one-out-of-eight code, i.e., a signal appears on only one of the eight conductors for each of the numbers applied to the input;

FIG. 1(*g*) represents a frequency dividing circuit which divides by three;

FIG. 1(*h*) represents a bistable circuit or "flip-flop" to which a control signal is applied on one of its inputs 94–1 or 94–0 to set it in the 1 state or in the 0 state. A voltage of the same polarity as the control signals is present either on output 95–1, when the flip-flop is in the 1 state, or on output 95–0, when the flip-flop is in the 0 state. If a flip-flop is referenced B1, the logical condition characterizing the fact that it is in the 1 state will be written B1, the one characterizing the fact that it is in 0 state will be written $\overline{\mathbf{B1}}$.

The coder according to the invention uses, as a reference signal, a sawtooth or staircase signal the rise time of which is shorter than or equal to the duration of a repetition period TR minus a channel time slot.

FIG. 2 represents a repetition period TR of the reference signal constituted, by way of example, by a sawtooth of maximum amplitude $V_s=E_c$, where $E_c$ denotes the maximum amplitude of the signals to be coded.

In this figure;

T'1 and T''1 are the rise and fall times of the sawtooth wave $T'2=TR-T'1$;

T1 is the transmission time of the codes corresponding to the (*m*—1) analog signals;

T2 is the transmission time of the synchronization code.

The amplitude range present between 0 and $V_s$ is is quantized in $2^n$ steps for a *n* — digit coding so that $$T'1=2^n\times ta \qquad (1)$$

*ta* denoting the duration of the repetition period of the advance pulses applied to the counter which delivers the codes characterizing the voltages to be coded.

It will be assumed that:

$$T'2=D\times ta \qquad (2)$$

D being an integer

Moreover:

$$T1=(m-1)\times n\times tb \qquad (3)$$

$$T2=n\times tb \qquad (4)$$

*tb* denoting the bit duration with $TR=m\times n\times tb$.

As was seen above, one must have:

$$T'1\leqslant T1 \qquad (5)$$

If $T'1<T1$, one must have $$T'2>T2 \qquad (6)$$

If $T'1=T1$, one must have $$T''1\leqslant T2 \qquad (7)$$

Finally, if F*m* denotes the maximum frequency of the signals to be coded, the duration of the repetition period must be such that:

$$\frac{1}{TR}>2Fm \qquad (8)$$

It will be noted that the coding can be carried out correctly within wide margins of the duty factor $T'1/T1$ on condition that said factor be lower than or equal to 1 and that the above inequality is satisfield.

The following is the description of a coder according to the present invention which, for purposes of explanation only, is assumed to be able to code (*m*—1) analog signals in 8 digit binary numbers ($n=8$) with $T'1<T1$ and $m\times n>2^n$.

FIG. 3 represents the diagram of the coder according to the invention which includes:

the signal generator AG;
the sawtooth generator SG;
the group of comparators CM;
the group of memories MR comprising memories MR1 and MR2;
the circuit for insertion of the synchronization code, referenced CS.

In generator AG, pulse generator A—which operates permanently—controls the advancing of binary counters C1 and C3 through the frequency dividers E1 and E2 respectively. The dividing factors of these circuits, which are integers denoted *p* and *q*, satisfy the following relation in which durations *ta* and *tb* have been previously defined by Equations 1 to 4:

$$\frac{p}{q}=\frac{tb}{ta} \qquad (9)$$

Counter C1 has a capacity of *c* digits with $2^c=n$, namely, $c=3$ and $n=8$ in the case considered, and the signals appearing on its three outputs are applied to decoder D1 comprising $n=8$ outputs on which the digit time slot signals referenced *t*1 to *t*8 appear. Counter C2 having a capacity of *b* digits with $2^b=m$ is controlled by signals T8 and decoder D2 related to the counter has *m* outputs on which the channel time slot signals V1, V2, . . . , V (*m*—1), V*m* appear. The set of signals delivered by decoders D1 and D2 defines a repetition period TR comprising $m\times n$ bit times.

The capacity of the binary counter C3 is $n=8$ digits and its outputs are applied to decoder D3 which is designed in such a way as to deliver an output signal when number zero appears in said counter.

This signal and the channel time slot signal V1 are applied to the inputs of a flip-flop in such a way that the latter delivers a signals F in the time interval between the beginning of time V1 and the display of the number zero in counter C3.

This signal F, of rectangular form, is used to control the sawtooth voltage delivered by the circuit SG, the duration of which is T'1 (see FIG. 2). Sawtooth generating circuits in which the rise time is controlled by a rectangular signal are well known and will not be described. It will be noted, however, that, because of the choice of $T'1<T1$ and $m\times n>2^n$, the time $TR-T'1$ is available for the sawtooth fall time.

The group of comparators CM comprises (*m*—1) comparators M1, M2, . . . , M (*m*—1) which receive on first input the sawtooth signal delivered by generator SG on its output B*a*. Each of the comparators receives on its second input one of the analog signals to be coded N1, N2, . . . , N (*m*—1) and yields a signal on its output S1, S2, . . . , S (*m*—1) when the compared voltages are identical.

It is well understood that these comparisons are effected in a perament fashion. As the repetition frequency $1/TR$ of the sawtooth signal has been chosen greater than twice the frequency of the signal to be coded of the highest frequency (see inequality 7), a comparator will at most deliver one signal per repetition period.

Strictly speaking, if a signal of frequency $1/TS$ and maximum amplitude $E_c$ is coded, this condition is fulfilled for $$Ec\leqslant\frac{1}{\tau}\times\frac{TS}{TR}\times VS \qquad (10)$$

When the coder is used for speech signals in a telephone network for which one has chosen, for instance, $$\frac{1}{TR}=8kHz$$

inequality (10) is satisfied if the attenuation for the maximum frequency $$\frac{1}{TSM}=3.4kHz$$

is 2.5 decibels below the attenuation for the minimum frequency. This is always the case in a telephone network due, in particular, to the characteristic of the microphones. If one wants to transmit frequency $1/TSM$ without attenuation one can, for instance, select a priori the first result of the comparison in each repetition period, or else reduce the duration T'1 of the sawtooth.

The group of memories MR comprises the memories MR1 and MR2 which both have ($m-1$) lines assigned to the numbers characterizing the value of the ($m-1$) signals to be coded and $n$ columns for recording $n$-digit numbers.

The signals S1, S2 . . . S ($m-1$) delivered by the group of comparators CM are applied to the memory MR1 in order to control the writing of the code shown by the counter C3 at the time of generation of these signals, writing can be effected only during time T'1 defined by signal F (multiple AND circuit P$a$).

This code represents the amplitude of the sawtooth signal, since counter C3 which delivers it can have $2^n$ distinct states during the same time T'1 (signal F applied to the AND circuit P$c$ placed in generator AC).

Selection for writing in memory MR1 is effected by coincidence of two signals, the line selection signals applied to input WL being the signals S1 to S ($m-1$) and the column selection signals applied to input WC being the codes delivered by counter C3 on the group of conductors B$c$.

It will be noted that with the coding principle used, two or more comparators can deliver simultaneously a line selection signal in memory MR1. It is well understood that the same number will then be written simultaneously in the corresponding memory lines provided that the power delivered by the column signal generators is sufficient.

As has previously been seen, the channel time slot V$m$ reserved for transmission of the synchronization code is used to transfer the content of memory MR1 into memory MR2 (time T2, FIG. 2). Selection for reading memory MR1 and selection for recording in memory MR2 are effected in a linear way, for instance, by applying the digit time slot signals to the selection inputs—RC for MR1 and WC for MR2—during time slot V$m$ (multiple AND circuit P$b$.)

As $n$ digit time slots are available for transferring ($m-1$) $n$ digit numbers, this operation is effected column by column, information being transmitted over the group of ($m-1$) conductors B$d$. In this way, signal $t1$ controls the simultaneous transfer of the first digit of all numbers recorded in memory MR1, signal $t2$ controls the transfer of the second digit of all these numbers etc. . . .

Information transferred in this memory MR2 is transmitted to the utilization circuits during the next repetition period. This operation can be effected either in a parallel fashion by using the $m$ channel time slot signals delivered by decoder D2, or in a serial fashion by combining these signals with the digit time slot signals delivered by decoder D1, which enables the obtaining of $m\times n$ bit signals. If this second type of transmission is considered, the digit signals control the column selection for read-out (input RC) and the channel time slot signals control the line selection for said read-out (input RL) in memory MR2. The memory, thus, operates by coincidence of signals for this read-out operation.

The signals read from this memory MR2 appear on conductor B$e$ and are applied to circuit CS which comprises the synchronization code generator H and the OR circuit P$d$. This generator is activated at time V$m$ reserved for transmission of the synchronization code and it receives the bit signals $t1$ to $t8$. If, for instance, the synchronization code is the binary code 00111100, generator H includes four AND circuits which are activated at $t3$, $t4$, $t5$, $t6$, respectively, and the outputs of which are connected to four inputs of OR circuit P$d$.

Depending on conditions imposed by the sampling frequency, the number of channels, the coding precision and the transmission channel capacity, one can be led to use a different signal generator AG without departing from the scope of the present invention. In particular, if the available transmission channels are of a limited capacity, one can be led, for instance, to design memory MR2 in such a way that, from the point of view of read-out, it is divided in several sections which are read out simultaneously; pieces of information which are obtained at the output of the sections are transmitted on an equal number of transmission channels. Modifications which must then be effected to circuit AG will be quite plain to the skilled man.

It is interesting to indicate here a case encountered in practice in which the number of channels is equal to the number of quantitzing levels, i.e., $m-1=2^n-1$. It is then possible to use the two counters C1 and C2 only, the first one having a capacity of $c$ digits with $2^c=n$ and the second having a capacity of $n$ digits.

Counter C2 is then used not only to control transmission, but also to effect coding.

During this operation, it delivers the codes to memory MR1 and it controls the starting and return to zero of the sawtooth wave when codes zero and $2^n-1$ are shown on it, respectively.

Modifications applied to FIG. 3 in this case will be quite plain to the skilled man.

While the principles of the above invention have been described in connection with specific embodiments and particular modifications thereof it is to be clearly understood that this description is made by way of example and not as a limitation of the scope of the invention.

I claim:

1. A coder to convert each of a plurality of analog signals into a code group representing its amplitude, each of said code groups occupying a different preassigned intelligence channel of a time division multichannel signal comprising:

a different input for each of said analog signals;

first means to generate during each frame of said multichannel signal a single increasing amplitude reference signal of predetermined configuration having a duration substantially equal to and coincident with the duration of a frame of said multichannel signal; and second means coupled simultaneously to each of said inputs and said first means operative during each frame of said multichannel signal to separately compare the amplitude of each of said analog signals to the amplitude of said reference signal and provide a code group for each of said analog signals representing the amplitude thereof at the time of amplitude coincidence of each of said analog signals and said reference signal.

2. A code according to claim 1, wherein said second means includes third means to sequentially generate a plurality of different code groups, each of said code groups representing a different discrete amplitude of said reference signal.

3. A coder according to claim 1, wherein said second means includes a plurality of amplitude comparison means each coupled to a different one of said inputs and in common to said first means to compare the amplitude of the associated one of said analog signals and said reference signal and produce a control signal upon amplitude coincidence of the compared signals.

4. A coder according to claim 1, wherein said predetermined configuration of said reference signal has a nonlinear characteristic to provide amplitude compression of said analog signals.

5. A coder according to claim 1, wherein said predetermined configuration of said reference signal has a linear sawtooth characteristic.

6. A coder according to claim 1, wherein said predetermined configuration of said reference signal has a staircase characteristic.

7. A coder according to claim 1, further including means coupled to said second means to produce a synchronizing signal in the synchronizing channel time of said multichannel signal and combine said code groups therewith to provide said multichannel signal.

8. A coder according to claim 1, wherein said second means includes:

third means to sequentially generate a plurality of different code groups, each of said code groups representing a different discrete amplitude of said reference signal;

a plurality of amplitude comparison means each coupled to a different one of said inputs and in common to said first means to compare the amplitude of the associated one of said analog signals and said reference signal and produce a control signal upon amplitude coincidence of the compared signals; and fourth means coupled to said third means and each of said comparison means responsive to each of said control signals to provide for the appropriate one of said intelligence channels the code group present in said third means at the time of producing said control signals.

9. A coder according to claim 8, wherein said fourth means includes:

a first storage means coupled to each of said comparison means and said third means responsive to said control signals during a given frame of said multichannel signal to separately store for each of said intelligence channels the code group present in said third means at the time of producing said control signals;

a second storage means coupled to said first storage means, said second storage means and said first storage means being activated during the synchronizing channel time of said multichannel signal to transfer said code groups stored in said first storage means to said second storage means for separate storage therein; and means coupled to said second storage means to read out said code groups transferred thereto during the next succeeding frame of said multichannel signal while said first storage means is storing the next succeeding code groups resulting from the comparison in said comparison means.

10. A coder according to claim 9, wherein said third means includes:

a coding counter having parallel digit outputs coupled to said first storage means, and a pulse generator coupled to said coding counter to activate the same to produce said plurality of different code groups; and said second means further includes:

fifth means coupled to said pulse generator to produce channel timing signals to control the read out of said second storage means and said transfer between said first and second storage means and code group digit timing signals to control the read out of said second storage means and said transfer between said first and second storage means, and sixth means coupled to said coding counter to produce a control pulse to control the operation of said first means, the response of said first storage means to said control signals and the generation of said code groups in said coding counter.

References Cited

UNITED STATES PATENTS

| | | |
|---|---|---|
| 2,946,044 | 7/1960 | Bolgiano et al. |
| 3,201,777 | 8/1965 | Brown. |
| 3,274,339 | 9/1966 | Herry et al. |
| 3,312,783 | 4/1967 | Martin et al. |

MAYNARD R. WILBUR, Primary Examiner

J. GLASSMAN, Assistant Examiner

U.S. Cl. X.R.

179—15